United States Patent
Malleni (10) Patent No.: US 11,301,363 B2
(45) Date of Patent: Apr. 12, 2022

(54) DYNAMIC CORRELATION OF LOG MESSAGES WITH CONTINUOUS INTEGRATION TEST JOBS

(71) Applicant: Red Hat, Inc., Raleigh, NC (US)

(72) Inventor: Sai Sindhur Malleni, Marlborough, MA (US)

(73) Assignee: RED HAT, INC., Raleigh, NC (US)

(*) Notice: Subject to any disclaimer, the term of this patent is extended or adjusted under 35 U.S.C. 154(b) by 0 days.

(21) Appl. No.: 17/004,805

(22) Filed: Aug. 27, 2020

(65) Prior Publication Data

US 2022/0066910 A1 Mar. 3, 2022

(51) Int. Cl.
| | | |
|---|---|---|
| G06F 11/36 | (2006.01) | |
| G06F 9/445 | (2018.01) | |
| G06F 16/245 | (2019.01) | |
| G06F 16/248 | (2019.01) | |
| G06F 8/60 | (2018.01) | |
| G06F 9/455 | (2018.01) | |

(52) U.S. Cl.
CPC ............ *G06F 11/3664* (2013.01); *G06F 8/60* (2013.01); *G06F 9/44505* (2013.01); *G06F 11/3688* (2013.01); *G06F 16/245* (2019.01); *G06F 16/248* (2019.01); *G06F 9/455* (2013.01); *G06F 11/362* (2013.01)

(58) Field of Classification Search
CPC .............. G06F 11/3664; G06F 11/245; G06F 11/248; G06F 11/3688; G06F 11/362; G06F 8/60; G06F 9/44505; G06F 9/455
USPC .................................................. 717/124–140
See application file for complete search history.

(56) References Cited

U.S. PATENT DOCUMENTS

| | | | | |
|---|---|---|---|---|
| 5,903,718 A * | 5/1999 | Marik | ................. | G06F 11/3648 714/38.13 |
| 6,008,636 A * | 12/1999 | Miller | .................... | G01R 31/01 324/757.01 |
| 6,286,131 B1 * | 9/2001 | Beers | ................. | G06F 11/3664 703/22 |
| 6,724,730 B1 * | 4/2004 | Mlinarsky | ............... | H04L 43/50 370/241 |

(Continued)

OTHER PUBLICATIONS

Daly et al., "The Use of Change Point Detection to Identify Software Performance Regressions in a Continuous Integration System", ACM, pp. 67-75 (Year: 2020).*

(Continued)

*Primary Examiner* — Anil Khatri
(74) *Attorney, Agent, or Firm* — K&L Gates LLP (57) ABSTRACT

Systems and methods for correlating continuous integration compute jobs with log messages. In some examples, a computing testing component may cause a first compute job to be deployed by a system under test (SUT) including at least one compute node. First identifier data may be generated that identifies the first compute job from among other compute jobs. The SUT may receive configuration data including the first identifier data. The SUT may generate a log message during execution of the first compute job. The log message may include the first identifier data. The computing testing component may receive result data for the first compute job from the SUT. The result data may include the first identifier data. The log message may be stored in a data store in association with the first identifier data and the first identifier data may correlate the log message with the first compute job.

18 Claims, 6 Drawing Sheets

(56) References Cited

U.S. PATENT DOCUMENTS

| | | | | |
|---|---|---|---|---|
| 6,959,433 B1* | 10/2005 | Morales, Jr | ......... | G06F 11/3664 714/E11.207 |
| 7,016,800 B1* | 3/2006 | Nguyen | ............. | G06F 11/3664 702/108 |
| 7,950,004 B2* | 5/2011 | Vieira | ................ | G06F 11/3688 717/125 |
| 8,004,994 B1* | 8/2011 | Darisi | ....................... | H04L 1/18 370/241 |
| 8,122,437 B2* | 2/2012 | Xu | ..................... | G06F 11/3636 717/128 |
| 8,510,712 B1* | 8/2013 | Killmar, III | ........ | G06F 11/3684 717/124 |
| 9,317,412 B1* | 4/2016 | Cohen | ................ | G06F 11/3688 |
| 9,870,221 B2* | 1/2018 | Benedict | ................... | G06F 8/70 |
| 10,037,263 B1* | 7/2018 | Kegley | .............. | G06F 11/3688 |
| 10,489,282 B2 | 11/2019 | Peer et al. | | |
| 10,515,005 B1 | 12/2019 | Burrell et al. | | |
| 10,621,068 B2 | 4/2020 | Kruszewski et al. | | |
| 10,635,476 B2* | 4/2020 | Blum | ................... | G06F 11/3688 |
| 10,872,025 B1* | 12/2020 | Wu | ..................... | G06F 11/3466 |
| 11,030,077 B1* | 6/2021 | Kwan | ................. | G06F 11/3664 |
| 2020/0250074 A1* | 8/2020 | Zhang | ................ | G06F 11/3688 |

OTHER PUBLICATIONS

Cohen et al., "The Automatic Efficient Test Generator (AETG) System", IEEE, pp. 303-309 (Year: 1994).*

Elbaum et al, "Prioritizing Test Cases for Regression Testing", ACM, pp. 102-112 (Year: 2000).*

Drusinsky, "Model Checking of Statecharts using Automatic White Box Test Generation", IEEE, pp. 327-332 (Year: 2005).*

Baudry et al., "Improving Test Suites for Efficient Fault Localization", ACM, pp. 82-91 (Year: 2006).*

Heimdahl et al., "Test-Suite Reduction for Model Based Tests: Effects on Test Quality and Implications for Testing", IEEE, pp. 1-10 (Year: 2004).*

Zaidman et al., "Mining Software Repositories to Study Co-Evolution of Production & Test Code", IEEE, pp. 220-229 (Year: 2008).*

Brandt et al.; LogChunks: A Data Set for Build Log Analysis; 17th International Conference on Mining Software Repositories (MSR '20); 2020; 5 pages.

Author unknown; Reconciliation Job Logging; Downloaded from https://docs.bmc.com/docs/ac1805reconciliation-job-logging-836466237.html on Jun. 1, 2020.

* cited by examiner

DYNAMIC CORRELATION OF LOG MESSAGES WITH CONTINUOUS INTEGRATION TEST JOBS

BACKGROUND

The present disclosure generally relates to testing of software deployed in shared computing environments such as multi-tenant cloud environments. Specifically, shared computing environments, whether public or privately implemented within an organization, typically employ orchestration of the deployment of isolated guests that perform the computing tasks in the networked computer systems. In computer systems, it may be advantageous to implement, test, and/or scale application deployments using isolated guests such as virtual machines and containers that may be used for creating hosting environments for running application programs. Guests providing execution environments and storage enable a programmer to quickly scale the deployment of applications to the volume of traffic requesting the applications, and may be deployed in a variety of hardware environments. Software deployment in such distributed environments may be tested on a system under test (SUT) for debugging and to ensure reliability and performance prior to release.

SUMMARY

The present disclosure provides a new and innovative system, methods and apparatus for correlation of log messages generated by a SUT with computing testing component jobs. In an example, a computing testing component may cause a first compute job to be deployed by a SUT including at least one compute node. In various examples, first identifier data that identifies the first compute job from among other compute jobs may be generated. The SUT may receive configuration data comprising the first identifier data. The SUT may generate at least a first log message during execution of the first compute job. In some examples, the first log message may include the first identifier data. In various examples, the computing testing component may receive result data for the first compute job from the SUT. The result data may include and/or be associated with the first identifier data. In some further examples, the first log message may be stored in a data store in association with the first identifier data. The first identifier data may correlate the first log message with the first compute job.

In another example, at least one processor is configured to execute an orchestrator component. A computing testing component is configured to send first instructions to a SUT. The instructions may be configured to cause the SUT to deploy a first compute job. In some examples, the orchestrator component may be configured to generate first identifier data identifying the first compute job from among other compute jobs. In some further examples, the orchestrator component may send configuration data to the SUT. In an example, the configuration data may include the first identifier data. The configuration data may be configured to cause the SUT to generate at least a first log message during execution of the first compute job. The first log message may include and/or be associated with the first identifier data. In various examples, the configuration data may be configured to cause the SUT to send result data comprising the first identifier data to the computing testing component. In some examples, the result data may be for the first compute job. In various examples, the configuration data may be further configured to cause the SUT to store the first log message in a data store in association with the first identifier data. In an example, the first identifier data may correlate the first log message with the first compute job.

In yet another example, a non-transitory machine-readable medium may store a program, that when executed by at least one processor may cause the at least one processor to cause a first compute job to be deployed by a SUT that includes at least one compute node. In various examples, the program, when executed by the at least one processor may further cause the at least one processor to generate first identifier data identifying the first compute job from among other compute jobs. In another example, the program, when executed by the at least one processor may further cause the at least one processor to send configuration data comprising the first identifier data to the SUT. In another example, the program, when executed by the at least one processor may further cause the at least one processor to receive, from the SUT, at least a first log message during execution of the first compute job. In various cases, the first log message may include and/or otherwise be associated with the first identifier data. In still other examples, the program, when executed by the at least one processor may further cause the at least one processor to receive, from the SUT, result data for the first compute job. In some cases, the result data may include the first identifier data. In at least some other examples, the program, when executed by the at least one processor may further cause the at least one processor to store the first log message in a non-transitory computer-readable memory in association with the first identifier data. In yet other examples, the first identifier data may correlate the first log message with the first compute job.

Additional features and advantages of the disclosed method and apparatus are described in, and will be apparent from, the following Detailed Description and the Figures.

DETAILED DESCRIPTION OF EXAMPLE EMBODIMENTS

With the rise of distributed software, cloud-based infrastructure, microservices, and other recent trends in software development and deployment, a single software instance is now typically comprised of several individual components that work together to perform a service. In order to debug such components and ensure both overall software performance and individual software component performance, the individual components are typically tested, deployed, updated, and scaled independently. With the increase in the number of components and software complexity, robust continuous integration (CI) testing frameworks have been developed for running test cases in an automated fashion. CI typically refers to an automated process for building, merging, and testing of code to debug the code and ensure aggregated software performance prior to full integration and/or software release. In general, CI systems have pipelines of different compute jobs (e.g., new code for integration testing) that may be launched on one or more SUTs. In CI, changes are typically merged into a project's main code base as often as possible (e.g., after completing work on each module). These changes are then built into an executable program that is run against a standard test suite as a compute job or "test," typically as a set of automated tests specific to the application executed on one or more SUTs. Each change is therefore incremental and multiple developers may work on the same codebase with assurance that their incremental changes will work with those of their colleagues before a final release is pushed to consumers. In various examples, the SUTs may be dedicated computing systems used for CI testing. Accordingly, CI systems control and launch different compute jobs for test on a SUT. During execution of the compute jobs, the SUT (and/or a log collector component) generates log messages related to software being tested by the compute jobs and returns result data to the CI system. For example, in a compute job that is testing an OpenShift deployment, OpenShift log messages are generated. The log messages and/or result data may be useful to developers for evaluating performance of the software (and/or, more generally, the code being tested).

Organizations are building complex CI pipelines to functionally test each piece of code coming into a particular piece of software. In some cases, performance and scale-based regression tests are run to evaluate performance using CI systems. CI testing throughout build, test, and/or deployment automation phases are considered to be important for reliable software releases. Conceptually, CI testing may be thought of as receiving software "feedback" and every change to the software's code may trigger the feedback (CI testing) process. "Computing testing component(s)," as used herein, refers to any computing systems that launches and/or controls compute jobs used for testing software and/or code on one or more SUTs. CI systems are an example of a computing testing component.

Typically, during CI testing, the software stack is deployed on a SUT and a series of tests are run on the stack in a "CI pipeline." Taking the example of Red Hat® OpenShift® (PaaS), every line of code written and submitted by a developer may be subjected to peer review, followed by a set (pipeline) of CI tests (e.g., compute jobs). In this example, the compute jobs may include building OpenShift with the relevant change provided by the code, deploying OpenShift in some infrastructure set aside for CI purposes (e.g., an SUT), running unit tests that focus on the specific pieces of code changed, running functional tests, running integration tests, providing feedback/result data. Additionally, among these example tests, several individual tests (compute jobs) may make up the functional tests and/or integration tests. In a more particular example, if a line of code that affects storage in OpenShift is being tested using this CI pipeline, the functional tests may ensure that the code is providing the proper storage functionality. However, ultimately, the goal is for containers/pods in OpenShift to be able to consume the storage provided by the code. Accordingly, integration tests examine whether the code provides the relevant, intended functionality when integrated into the larger system.

Whenever a compute job deployed by CI fails (e.g., due to the code change causing a fault and/or undesirable effect), the fundamental problem becomes isolating the log messages generated by the SUT related to that particular failure/compute job. This is increasingly problematic today where the CI pipelines are more and more complex and where there are several compute jobs (sometimes referred to as "tests") in a CI pipeline, but only some of the compute jobs fail. A typical approach for correlating log messages of the SUT (e.g., an OpenShift deployment) with a specific compute job that failed is through use of timestamps, as each log message on the SUT is associated with a time stamp in the log message file. However, this approach is cumbersome as there may be hundreds of log messages being generated within a short period of time (e.g., within a single second). Additionally, this approach is error prone because there are often time synchronization issues between the CI system and the SUT. For example, the log messages on the SUT might use local time, while the errors reported by the CI system might be in coordinated universal time (UTC). In another example, even though the CI system and the SUT are coordinated through some synchronization approach (such as network time protocol (NTP)), discrepancies often occur, making identification of relevant log messages (e.g., correlation of log messages with CI compute jobs) difficult. Accordingly, due to the large number of log messages and potential timing discrepancies, an engineer attempting to locate log messages at a time at which a failure was reported may be unable to locate the relevant log messages/errors in the log file for the SUT.

In various examples described herein, identifier data that uniquely identifies a CI compute job is generated. A configuration file of the SUT (and/or of a log collector executing on the SUT) is modified so that each log message generated during execution of the CI job is associated with the identifier data that uniquely identifies that CI job. Accordingly, log messages are dynamically correlated with compute jobs. When the SUT changes from a first CI compute job to a second CI compute job, the configuration file is updated with the identifier data corresponded to the new (second) CI compute job so that any log messages generated will be associated with the new CI compute job. Accordingly, engineers and/or developers troubleshooting code and/or deployments may reference the log file and may lookup log messages corresponding to a particular CI compute job using the identifier data.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large-scale implementations, container schedulers, such as those included in container orchestrators (e.g., Red Hat® OpenShift®, Kubernetes®, Docker Swarm®), generally respond to frequent container startups and cleanups with low latency. Containers may enable widespread, parallel deployment of computing power for specific tasks. In a typical example, a container may be instantiated to process a specific task and reaped after the task is complete. During CI, many containers and/or other execution environments may be deployed and reaped during a compute job and/or during a pipeline of compute jobs. Automatically adding identifier data to log messages that uniquely identifies the compute job to which the log messages pertain may be beneficial in such an environment, especially since many different containers and/or other execution environments may be generating a large volume of log messages (for different CI compute jobs) over a short period of time.

Figure 1:
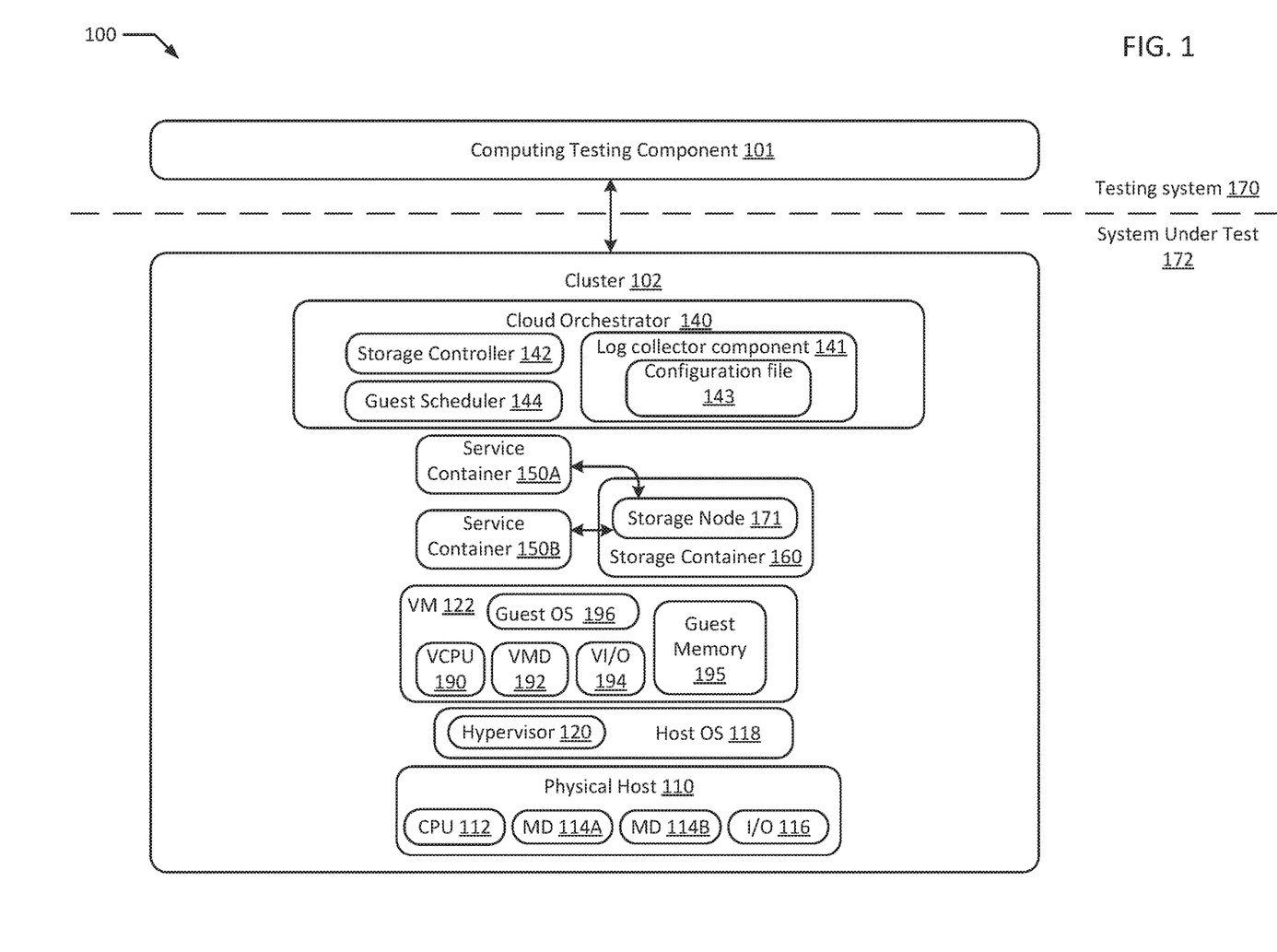
FIG. 1 is a block diagram of a computing testing component and a system under test according to an example of the present disclosure.

FIG. 1 is a block diagram of a computing testing component 101 and a system under test 172 according to an example of the present disclosure. The system 100 may include one or more physical host(s), including physical host 110. Physical host 110 may in turn include one or more physical processor(s) (e.g., CPU 112) communicatively coupled to one or more memory device(s) (e.g., MDs 114A-B) and one or more input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device(s) 114A-B refer to volatile or non-volatile memory devices, such as RAM, ROM, EEPROM, or any other device capable of storing data. In an example, memory devices 114A-B may be persistent storage devices such as hard drive disks ("HDD"), solid-state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116 refer to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within physical host 110, including the connections between processors 112 and memory devices 114A-B and between processors 112 and I/O device 116 may be provided by one or more local buses and/or interconnects of suitable architecture, for example, peripheral component interconnect (PCI).

In an example, physical host 110 may run one or more isolated guests, for example, VM 122, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In some examples, storage container 160 may include one or more storage nodes 171 that may communicate with service containers 150A, 150B. In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110, for example, implemented as a kernel based virtual machine function of host operating system 118. In another example, the hypervisor 120 may be provided by an application running on host operating system 118. In an example, hypervisor 120 may run directly on physical host 110 without an operating system beneath hypervisor 120 (e.g., in a "bare metal" implementation). Hypervisor 120 may virtualize the physical layer, including processors, memory, and I/O devices, and present this virtualization to VM 122 as devices, including virtual central processing unit ("VCPU") 190, virtual memory devices ("VIVID") 192, virtual input/output ("VI/O") device 194, and/or guest memory 195. In an example, another virtual guest (e.g., a VM or container) may execute directly on host OSs 118 without an intervening layer of virtualization.

In an example, a VM 122 may be a virtual machine and may execute a guest operating system 196, which may utilize the underlying VCPU 190, VIVID 192, and VI/O 194. Processor virtualization may be implemented by the hypervisor 120 scheduling time slots on physical CPUs 112 such that from the guest operating system's perspective those time slots are scheduled on a virtual processor 190. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196 such as guest memory 195 provided to guest OS 196.

In an example, storage container 160 and/or service containers 150A, 150B are similarly implemented. In an example, cloud orchestrator 140 may be hosted on one or more guests, for example, a service container similar to service containers 150A-B and cloud orchestrator 140 may be a virtualization orchestrator (e.g., Red Hat® OpenShift®, Kubernetes®) managing virtual compute resources for system 100. In various examples, service containers 150A-B and/or storage container 160 may be deployed by the SUT 172 as part of a compute job deployed on SUT 172 by computing testing component 101 (e.g., a CI system) of testing system 170. In some examples, cloud orchestrator 140 may represent a primary node of a cluster 102 of compute nodes on which a container (or other trusted execution environment) frame work is deployed. In some examples, cloud orchestrator 140 may include guest scheduler 144 for containers and/or VMs, network storage management (e.g., storage controller 142), API management, log collector component 141, etc. Log collector component 141 may generate log messages describing events of code and/or processes executing on cluster 102. For example, one or more compute jobs may cause components (e.g., software/code) to be deployed for testing on cluster 102 (e.g., the SUT 172) by computing testing component 101. The components executing on the cluster 102 of the SUT 172 to generate log messages during execution that may be aggregated and/or stored by log collector component 141. In various examples, log collector component 141 may include a configuration file 143 that controls the generation, storage, and/or composition of log messages generated by the SUT 172 during execution of various compute jobs.

In an example, cloud orchestrator 140 is implemented via a cluster 102 of containers instead of in a single container. In an example, storage controller 142 may be a storage cluster orchestrator (e.g., Rook®) managing the deployment of a distributed storage solution (e.g., Red Hat® Ceph®, OpenStack® Swift, Amazon S3®, etc.) that may additionally employ a distributed file system (e.g., Red Hat® GlusterFS®). In an example, storage controller 142 and/or guest scheduler 144 may be component parts of cloud orchestrator 140. In another example, storage controller 142 and/or guest scheduler 144 may be external components in communication with cloud orchestrator 140, for example, through an application programming interface ("API"). In an example, any form of suitable network for enabling communications between computing devices, for example, a public network (e.g., the Internet), a private network (e.g., a local area network (LAN) or wide area network (WAN)), or a combination thereof may be employed to connect the component parts of the system (e.g., cloud orchestrator 140, storage container 160, service containers 150A-B, etc.) to each other. In an example, cloud orchestrator 140, storage controller 142, log collector component 141, and/or guest scheduler 144 may be implemented via any suitable form of computing module (e.g., application, executable, script, hardware module, etc.). Although not shown in FIG. 1, other clusters of compute nodes of the SUT 172 may similarly deploy respective orchestrators 140 to deploy virtualized and/or distributed compute services and/or test compute jobs on different nodes of the respective clusters. As described in further detail below, computing testing component 101 of testing system 170 may deploy various different compute jobs (e.g., as part of a CI testing pipeline) through communication with cloud orchestrator 140.

Figure 2:
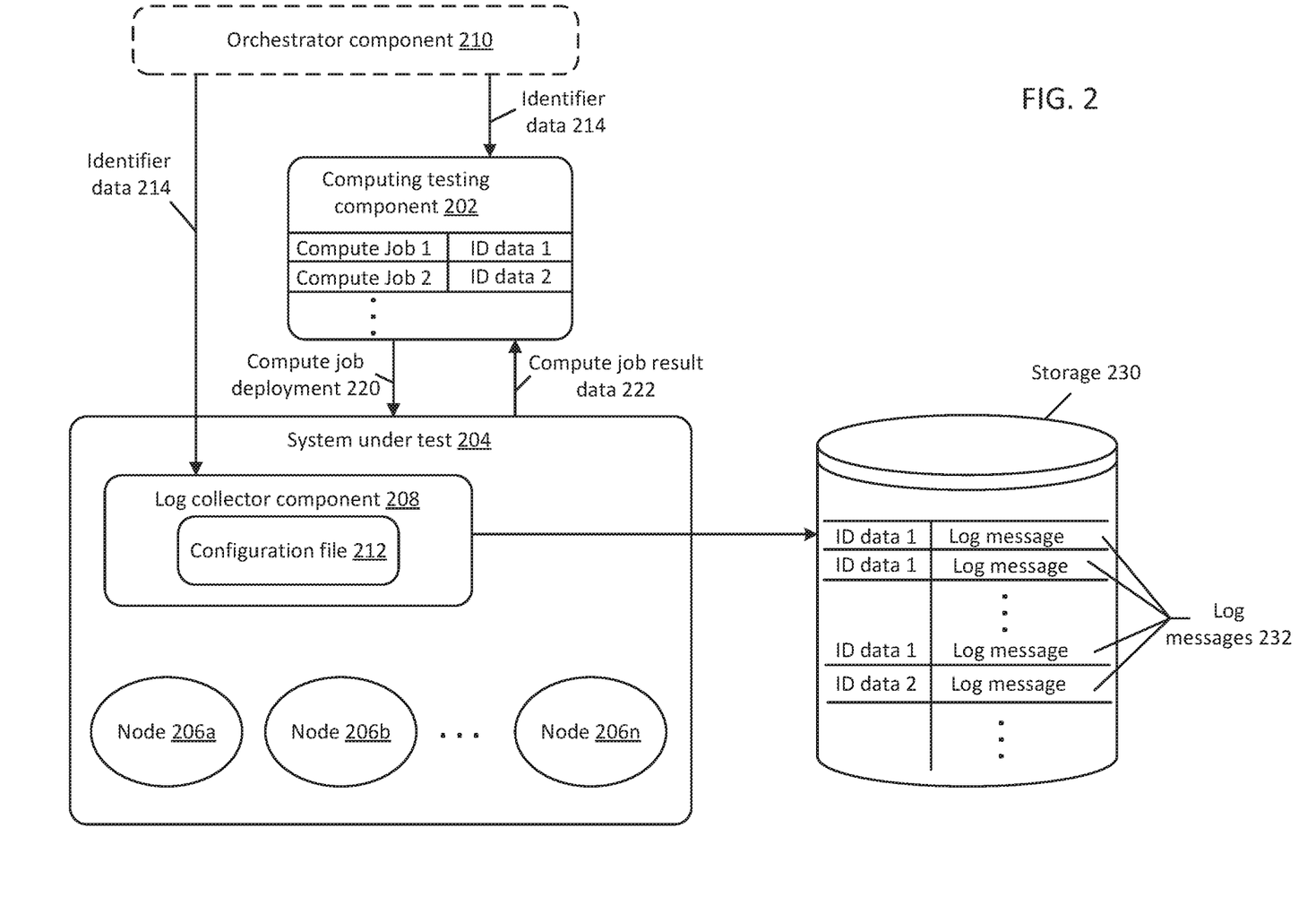
FIG. 2 is a block diagram illustrating communication between an orchestrator component, a computing testing component, a system under test, and storage according to various aspects of the present disclosure.

FIG. 2 is a block diagram illustrating communication between an orchestrator component 210, a computing testing component 202, a system under test 204 (SUT 204), and storage 230 according to various aspects of the present disclosure. A computing testing component 202 (e.g., a CI testing system and/or other computing testing component) may comprise a number of different compute jobs to be deployed on SUT 204 (e.g., on nodes 206a, 206b, ..., 206n of SUT 204) as a part of a testing pipeline. In the example depicted in FIG. 2, "Compute Job 1" and "Compute Job 2" are shown, although any number of compute jobs may be deployed by computing testing component 202.

In various examples described herein, identifier data 214 may be generated. Depending on the desired implementation, an orchestrator component 210 may generate the identifier data 214 for each compute job of computing testing component 202. The orchestrator component 210 may be a component that provides unique identifier data 214 for each compute job deployed by computing testing component 202 and may be different from the cloud orchestrator 140 deploying containers/pods described above in reference to FIG. 1. Orchestrator component 210 is depicted in FIG. 2 in a dashed box as such a component may not be used in some example embodiments. Instead, in some embodiments, the computing testing component 202 (e.g., the CI testing system) may generate unique identifier data 214 for each compute job deployed by computing testing component 202 (e.g., through compute job deployment 220).

Identifier data 214 may be metadata that uniquely identifies a compute job from among other compute jobs. Further, in various examples, identifier data 214 may comprise a string that uniquely identifies an SUT (e.g., a "cloud_name") related to the compute job. In the example depicted in FIG. 1, the identifier data 214—"ID data 1"—may uniquely identify "Compute Job 1" from among other compute jobs. Similarly, the identifier data 214—"ID data 2"—may uniquely identify "Compute Job 2" from among other compute jobs. Depending on the desired implementation, computing testing component 202 may request the identifier data 214 from orchestrator component 210 (or from some other dedicated component) for each new compute job received by computing testing component 202. In another example implementation, the computing testing component 202 may generate the unique identifier data 214 for each new compute job received by computing testing component 202.

The unique identifier data 214 may be, for example, a universally unique identifier (UUID) comprising a 128-bit number used to identify information in computer systems. However, other formats may be used for identifier data 214, in accordance with the desired implementation. The identifier data 214 that identifies a particular compute job may be included in configuration data sent by orchestrator component 210 and/or computing testing component 202 to SUT 204. For example, the configuration data comprising identifier data 214 identifying a particular compute job may be sent from computing testing component 202 to SUT 204 as part of the deployment of the particular compute job (e.g., as part of compute job deployment 220). In another example, the configuration data comprising identifier data 214 identifying a particular compute job may be sent from orchestrator component 210 to SUT 204 at the request of computing testing component 202, as part of the deployment of the particular compute job (e.g., as part of compute job deployment 220).

The configuration data comprising the identifier data 214 (whether sent by orchestrator component 210 or by computing testing component 202) may be received by log collector component 208 of the SUT 204. The log collector component 208 may collect and store log messages generated during the execution of various processes executing on the SUT 204 as a result of the compute jobs (e.g., processes deployed by the computing testing component 202). In some other examples, individual components of the SUT 204 (e.g., processes executing on the SUT 204 due to the compute jobs) may generate the log messages describing various events experienced by the processes and the log collector component 208 may aggregate and/or store such log messages (e.g., in a log file). The log collector component 208 may be associated with a configuration file 212 that provides instructions concerning the content and/or generation of log messages by the SUT 204 during execution of the various compute jobs. Additionally, the configuration file 212 may provide instructions concerning the transmission and/or storage of the log messages at a particular data store (e.g., storage 230). The configuration data comprising the job-specific unique identifier data 214 may be used to modify the configuration file 212 so that each log message generated by the log collector component 208 (and/or by the processes of the compute job) include the unique identifier data 214 associated with the particular compute job to which the log messages pertain. In other words the identifier data 214 may be added to log messages (e.g., by the system under test 204 and/or the log collector during execution of the relevant compute job).

In various further examples, the configuration data comprising the identifier data 214 may further comprise instructions to modify the configuration file 212 to cause the log collector component 208 to store the log messages in association with the appropriate identifier data 214 in storage 230 (e.g., a data store). For example, the configuration file 212 may be modified such that log messages are stored in association with identifier data 214 at the network address of storage 230.

As shown in FIG. 2, log messages 232 are stored in association with different ID data (e.g., examples of identifier data 214). In the example depicted, the top-most log message is stored in association with "ID data 1." ID data 1 may be associated with "Compute Job 1" (e.g., within a data structure of computing testing component 202, as shown). Accordingly, if a developer, software engineer, and/or other individual wants to locate and/or display the log messages associated with Compute Job 1, the individual can determine that ID data 1 uniquely identifies Compute Job 1 using an interface of computing testing component 202 (e.g., an interface of the CI system). Thereafter, the individual can perform a lookup of storage 230 using ID data 1 to return all log messages 232 that are associated with ID data 1 (and thus with Compute Job 1).

After the completion (or failure) of a particular compute job, SUT 204 may return compute job result data 222 to the computing testing component 202. The compute job result data 222 may indicate that the compute job completed successfully and/or failed (along with any other relevant data describing the compute job such as time stamps, the last log message, etc., in accordance with the particular implementation). For example, the compute job result data 222 may include message data indicating that the particular compute job failed or succeeded. In addition, the compute job result data 222 may comprise the identifier data 214 that uniquely identifies the particular compute job to which the compute job result data 222 pertains. As such, in the event of a failure (or for any other reason), an individual may use the unique identifier data 214 returned to find all the log messages on the SUT 204 that are associated with that particular compute job by using the identifier data 214 to lookup the log messages stored in storage 230 (e.g., a data store).

When a new compute job is deployed (and/or when instructions to execute a batched compute job are sent) by computing testing component 202, new configuration data pertaining to the new compute job may be sent and used to modify the configuration file 212, as described above. Accordingly, any new log messages generated will be associated with the appropriate identifier data 214 that uniquely identifies the relevant compute job from among other compute jobs. As previously described, the computing testing component 202 may provide the configuration data comprising the compute job-specific identifier data 214 and other instructions to modify configuration file 212. In other examples, the computing testing component 202 may instead request the unique identifier data 214 from the orchestrator component 210. The orchestrator component 210 may, in turn, provide the configuration data comprising the unique identifier data 214 used to modify the configuration file 212. Each time a new job is deployed, executed, and/or otherwise activated, the configuration file 212 may be modified so that log messages generated by the currently-executing compute job are automatically modified to include the identifier data 214 and are automatically stored at a particular storage location. At the conclusion of a compute job, configuration data may be sent by the orchestrator component 210 and/or by the computing testing component 202 to remove the identifier data 214 (and/or change the identifier data 214) that has been previously used to modify the configuration file 212.

For example, there may be three compute jobs deployed by computing testing component 202:

Job 1: Deploy an OpenShift cluster on nodes 206a, 206b, . . . , 206n of SUT 204

Job 2: Execute a test that scales the number of projects in the OpenShift cluster Job 3: Execute a test that deploys 500 pods per each of nodes 206a, 206b, . . . , 206n In the example, compute job result data 222 may indicate that Job 3 failed. In such a scenario, engineers may want to review log messages of OpenShift pertaining to Job 3 (and not all of the log messages since OpenShift was deployed in Job 1). Accordingly, the engineer may use the identifier data 214 associated with Job 3 to lookup the specific log messages that pertain only to Job 3.

The compute job result data 222 for Job 3 may be:
"job3": {
"name": pods per worker",
"success":false,
"uuid": "025f4784-93e7-4d6b-93 ea-a99c8feaa1ae"
}

In an example, the configuration file 212 (after modification to add identifier data 214 and/or instructions to store log messages in association with identifier data 214 at storage 230) may be similar to the example configuration file below. The log collector component 208 (or another component executing on the SUT 204) may generate log messages as specified in the configuration file 212. Accordingly, modification of the configuration file, as shown below, may be effective to append the identifier data 214 (e.g., the UUID) to each log message. Additionally, log messages may be stored at a storage location (e.g., storage 230) that is specified by the configuration file 212 (as modified). Accordingly, updating the configuration file 212, as described herein, automates the process of associating log messages with compute jobs and storing the log messages in a data store.

-type: log
  enabled: true
  #Paths that should be crawled and fetched. Glob based
    paths.
  Paths:
    -/var/log/ovn/controller.log
    -/var/log/api/kubeapi.log
  fields:
    cloud_name: CI-CLOUD
    Uuid: 025f4784-93e7-4d6b-93ea-a99c8feaa1ae
  output.datastore:
    #Array of hosts to connect to.
    hosts: ["{{datastore_ip}}:{{datastore_port}}" ]

Using the example configuration file above, the log collector component 208 may send every line from the log files /var/log/ovn/controller.log as a separate entry and may add a custom field that includes the identifier data 214 (e.g., the UUID) to every log message. Accordingly, filtering based on the identifier data 214 may retrieve all log messages from all log files of interest.

Figure 3:
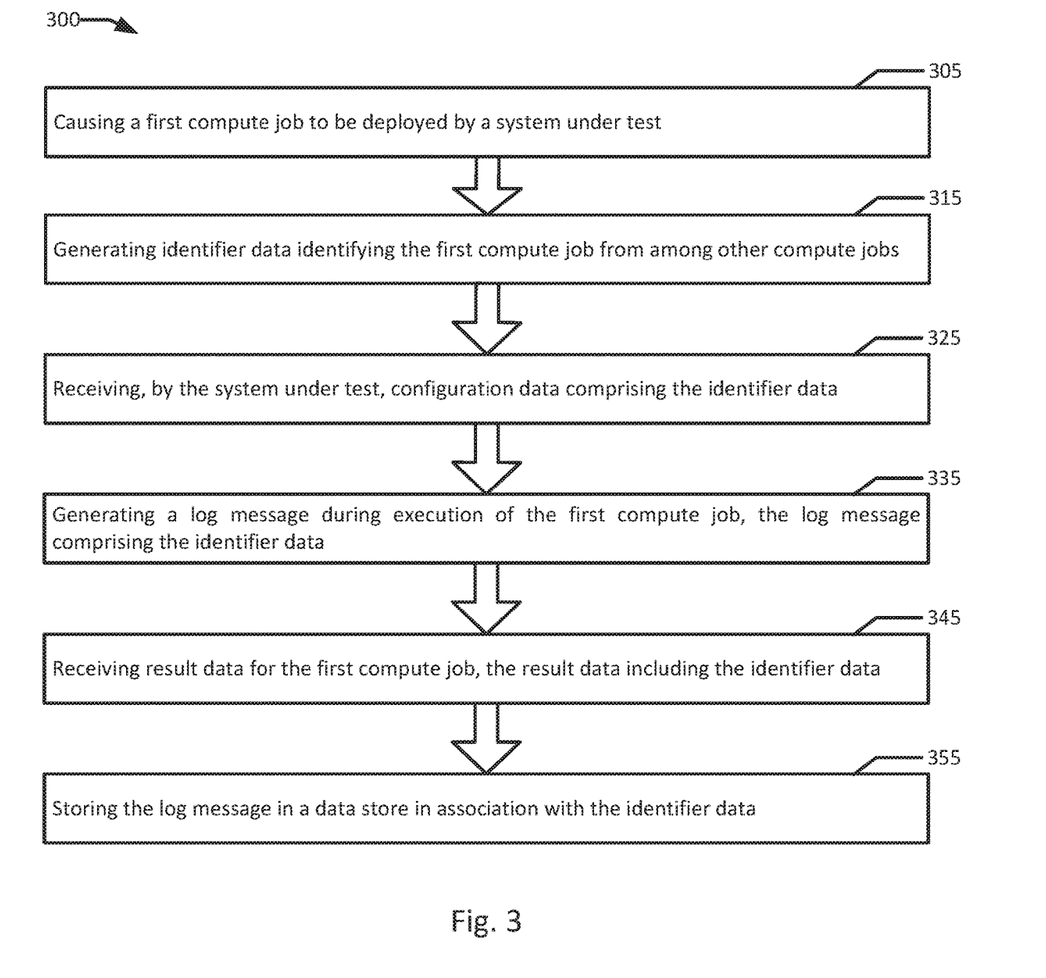
FIG. 3 is a flowchart illustrating an example process for correlating system under test log messages with computing test jobs according to an example of the present disclosure.

FIG. 3 is flowchart illustrating an example process 300 for correlating system under test log messages with computing test jobs according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes causing a first compute job to be deployed by a system under test (block 305). For example, computing testing component 202 may deploy a pipeline of compute jobs including the first compute job on SUT 204. In an example, the process 300 may include generating identifier data identifying the first compute job from among other compute jobs (block 315). For example, the computing testing component 202 may generate identifier data 214 uniquely identifying the first compute job from among other compute jobs. In some examples, the computing testing component 202 may instead request the identifier data 214 from the orchestrator component 210. The orchestrator component 210 may, in turn, generate the identifier data 214 uniquely identifying the first compute job and may send the identifier data 214 to both the SUT 204 (along with configuration data configured to modify the configuration file 212, as described above) and to the computing testing component 202.

In an example, the process 300 may include receiving, by the system under test, configuration data that includes the identifier data (block 325). As previously described, the SUT 204 may receive the configuration data that includes the identifier data uniquely identifying a particular compute job and may modify configuration file 212. In some examples, the SUT 204 may modify the configuration file such that any log messages generated by the first compute job executing on SUT 204 include the identifier data 214. Additionally, the SUT 204 may modify the configuration file such that the log messages and associated identifier data 214 may be stored in a particular data store identified by the configuration data.

In an example, the process 300 may include generating a log message including the identifier data during execution of the first compute job (block 335). The log message may describe an event that occurred during execution of the first compute job. In an example, the process 300 may include receiving result data for the first compute job, where the result data includes the identifier data (block 345). In various examples, the computing testing component 202 (e.g., a CI system) may receive the result data that includes a result of the first compute job. In an example, the process 300 may include storing the log message in a data store in association with the identifier data 214 (block 355). In at least some examples, the log collector component 208 may store the log message in the data store (e.g., storage 230) in association with the identifier data 214.

Figure 4A:
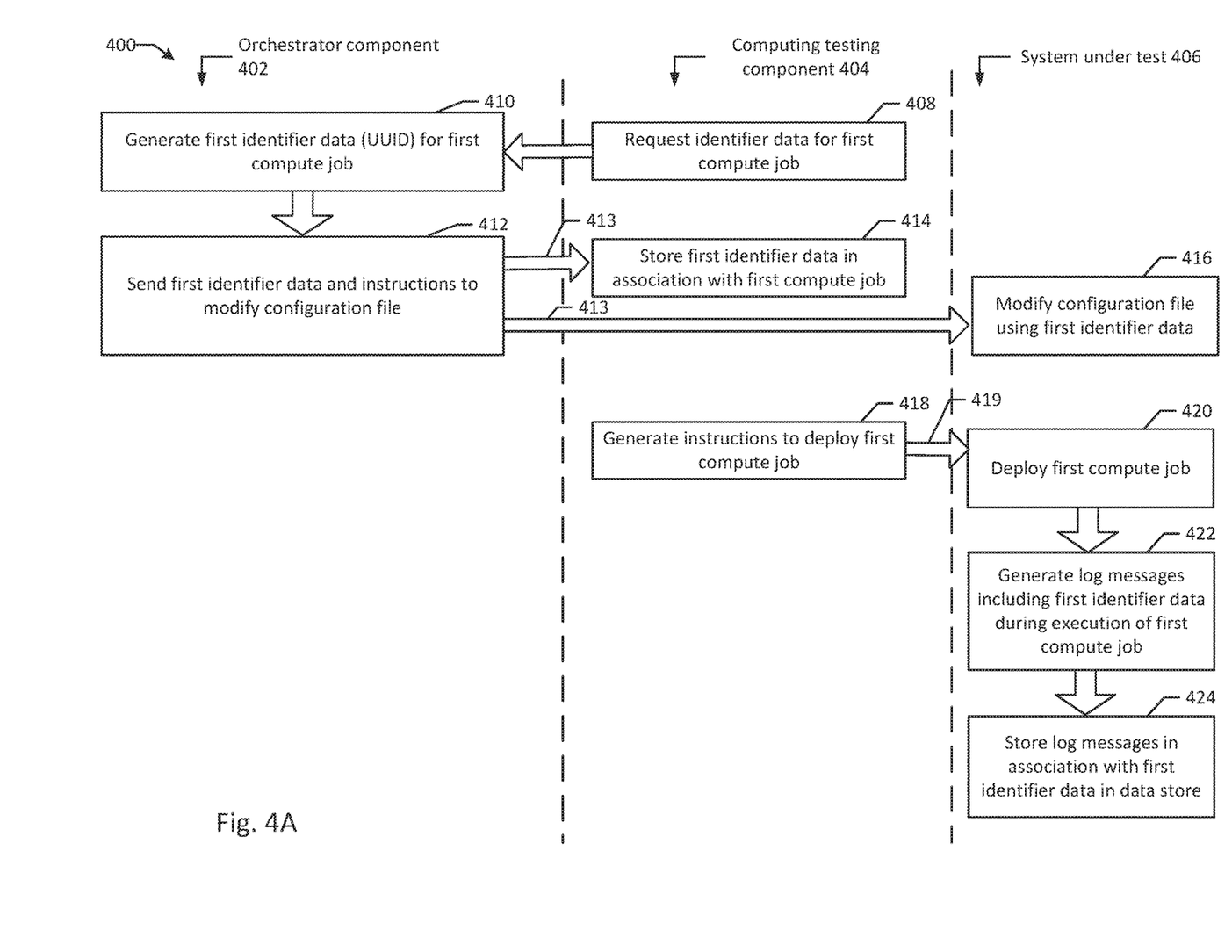
FIGS. 4A and 4B illustrate a flow diagram of an example of correlating log messages with different computing test jobs according to an example of the present disclosure.
Figure 4B:
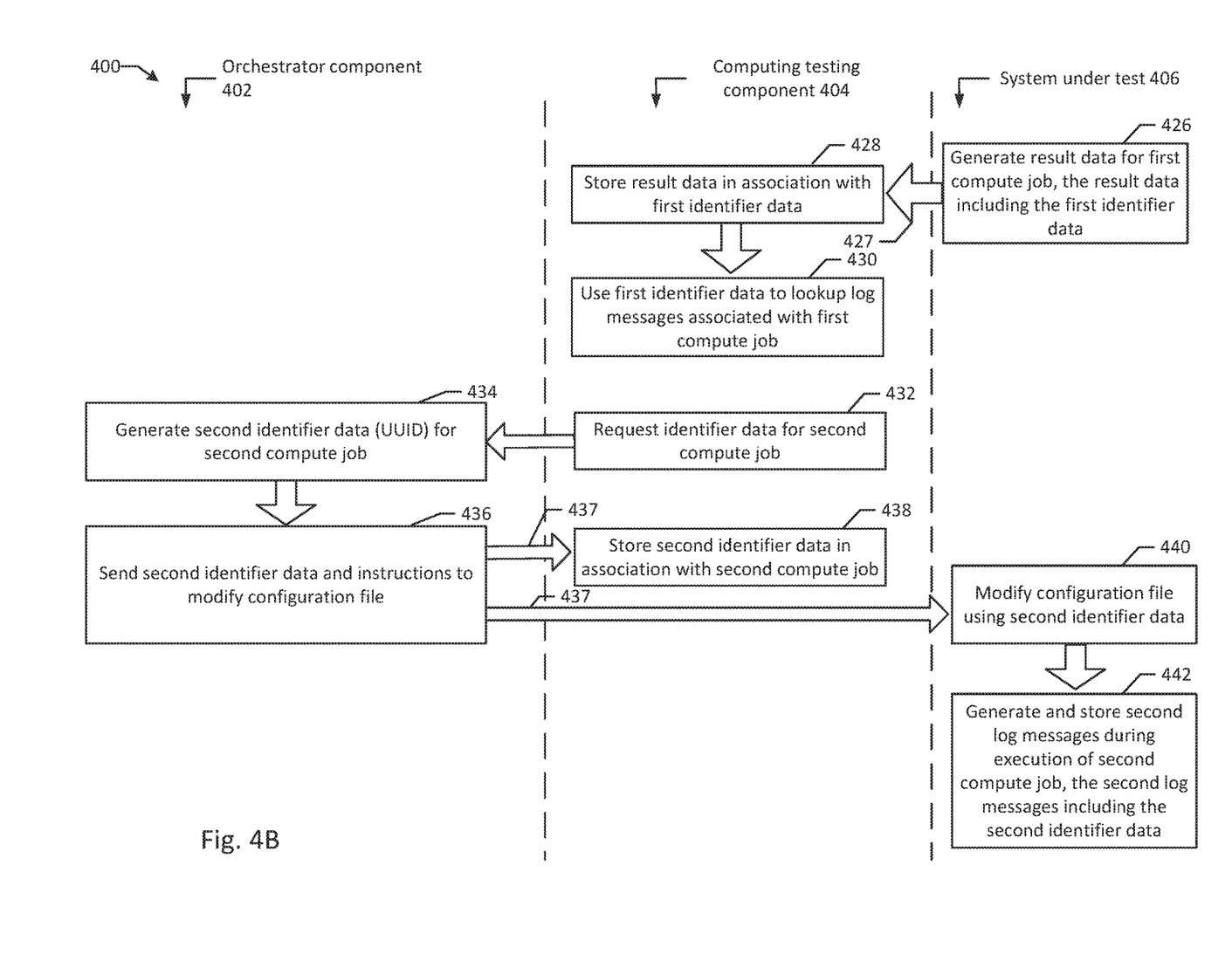

FIGS. 4A and 4B illustrate a flow diagram 400 of an example of correlating log messages with different computing test jobs according to an example of the present disclosure. Although the examples below are described with reference to the flow diagram illustrated in FIGS. 4A and 4B, it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In the illustrated example flow diagram 400, orchestrator component 402 generates unique identifier data for two different compute jobs and communicates the unique identifier data to the computing testing component 404 and to the system under test 406.

In the example depicted in FIG. 4A, computing testing component 404 may identify a first compute job for deployment and may request identifier data for the first compute job (block 408) from orchestrator component 402. Orchestrator component 402 may generate the first identifier data (e.g., a UUID) for the first compute job in response to receiving the request from the computing testing component (block 410). The orchestrator component 402 may send first identifier data and instructions to modify a configuration file of the system under test 406 (block 412). In some examples, the computing testing component 404 may receive the first identifier data 413 and may store the first identifier data in association with the first compute job (block 414). Additionally, in some examples, the system under test 406 may receive the first identifier data 413 and the instructions to modify the configuration file and may modify the configuration file using the first identifier data 413 and the instructions for modifying the configuration file (block 416).

In some examples, the computing testing component 404 may generate instructions 419 configured to cause the system under test 406 to deploy the first compute job (block 418). The computing testing component 404 may send the instructions 419 to the system under test 406. The system under test 406 may execute the instructions 419 to deploy the first compute job (420). For example, the system under test 406 may deploy the first compute job on one or more compute resources associated with the system under test 406.

The system under test 406 (and/or a log collector executed on the system under test 406) may generate log messages that include the first identifier data during execution of the first compute job (block 422). The system under test 406 may store the log messages in association with the first identifier data in a data store (block 424). In various examples, the data store in which to store the identifier data and the log messages may be specified in the instructions received from orchestrator component 402 used to modify a configuration file of the log collector.

As illustrated in FIG. 4B, the system under test 406 may generate result data 427 for the first compute job (e.g., upon completion or failure of the first compute job), the result data including the first identifier data (block 426). The system under test 406 may send the result data 427 to the computing testing component 404 and the computing testing component 404 may store the result data 427 in association with the first identifier data (block 428). The computing testing component 404 may use the first identifier data to lookup log messages associated with the first compute job (block 430). Accordingly, in some examples, engineers may use the first identifier data to determine the log messages that are associated with the first compute job from among other compute jobs.

Computing testing component 404 may request identifier data for a second compute job from orchestrator component 402 (block 432). Orchestrator component 402 may generate second identifier data (e.g., a UUID) that uniquely identifies the second compute job from among other compute jobs (block 434). The orchestrator component 402 may send the second identifier data and instructions to modify a configuration file of the system under test 406 (block 436). In some examples, the computing testing component 404 may receive the second identifier data 437 and may store the second identifier data 437 in association with the second compute job (block 438). Additionally, in some examples, the system under test 406 may receive the second identifier data 437 and the instructions to modify the configuration file and may modify the configuration file using the second identifier data 437 and the instructions for modifying the configuration file (block 440).

After deploying the second compute job, the system under test 406 may generate and store log messages during execution of the second compute job; the log messages may include the second identifier data 437 (block 442). The log messages and associated second identifier data 437 may be stored in a data store specified by the modified configuration file of the log collector.

Figure 5:
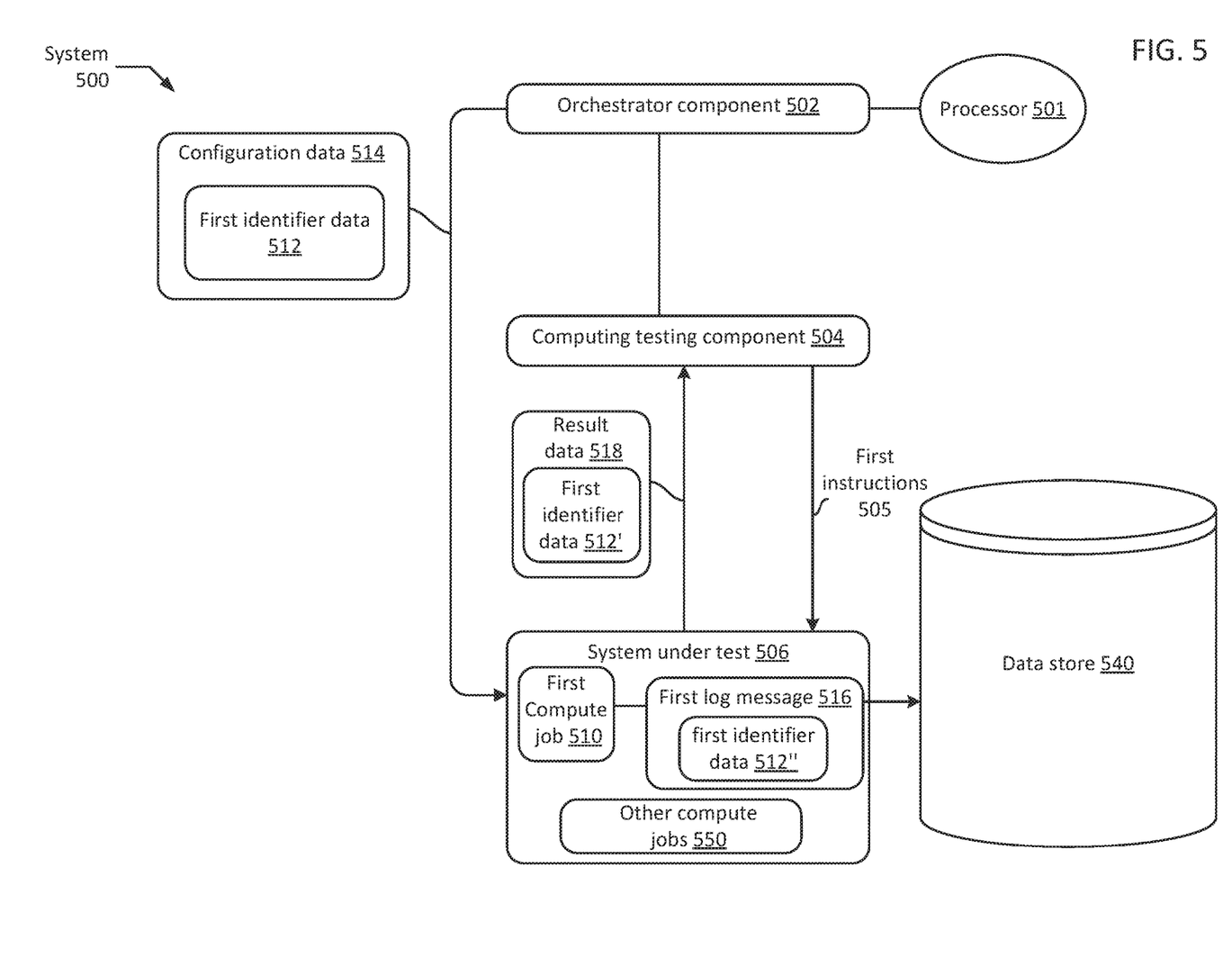
FIG. 5 is a block diagram of a system configured to correlate system under test log messages with computing test jobs, according to an example of the present disclosure.

FIG. 5 is a block diagram of a system 500 configured to correlate system under test log messages with computing test jobs, according to an example of the present disclosure. The system 500 may include at least one processor 501 executing an orchestrator component 502. The orchestrator component 502 may be configured in communication with a computing testing component 504 and a system under test 506. In various examples, the orchestrator component 502 may generate configuration data 514 including first identifier data 512. The first identifier data 512 may uniquely identify a first compute job 510 deployed by computing testing component 504 on system under test 506. For example, the first identifier data 512 may identify the first compute job 510 from among other compute jobs 550 executing on the system under test 506. In various examples, the computing testing component 504 may send first instructions 505 to system under test 506. The first instructions 505 may be configured to cause the system under test 506 to deploy the first compute job 510. In some examples, the computing testing component 504 may request the first identifier data 512 from the orchestrator component 502 prior to deploying the first compute job 510 (e.g., prior to sending first instructions 505). In other examples, the computing testing component 504 may generate the first identifier data 512 and the configuration data 514.

The orchestrator component 502 may send the configuration data including the first identifier data 512 to the system under test 506. The configuration data 514 may be configured to modify a configuration file of a log collector component executing on system under test 506. The modification of the configuration file may cause the system under test 506 (or a log collector component executing on the system under test 506) to generate first log message 516 including the first identifier data 512" during execution of first compute job 510. Additionally, the configuration data may be configured to cause the system under test 506 to send result data 518 including first identifier data 512' to the computing testing component 504. The result data 518 may be result data for the first compute job 510. Additionally, the configuration data and/or other instructions may cause the system under test 506 to store the first log message 516 in data store 540 in association with the first identifier data 512". The first identifier 512" may correlate the first log message 516 with the first compute job 510.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   causing, by a computing testing component, a first compute job to be deployed by a system under test, the system under test comprising a container based virtualization system comprising one or more compute nodes;
   generating first identifier data identifying the first compute job from among other compute jobs;
   receiving, by an orchestrator component of the container based virtualization system, configuration data comprising the first identifier data;
   generating, by a log collector component of the orchestrator component using the configuration data, at least a first log message during execution of the first compute job, wherein the first log message comprises the first identifier data;
   receiving, by the computing testing component from the system under test, result data for the first compute job, wherein the result data comprises the first identifier data;
   storing the first log message in a data store in association with the first identifier data, wherein the first identifier data correlates the first log message with the first compute job; and
   modifying, by the orchestrator component, the configuration data to remove the first identifier data after a conclusion of the first compute job.

2. The method of claim 1, further comprising:
   causing, by the computing testing component, a second compute job to be deployed by the system under test;
   generating second identifier data identifying the second compute job from among the other compute jobs; and
   generating second instructions configured to cause the second identifier data to be included in log messages output by the second compute job.

3. The method of claim 2, further comprising generating third instructions configured to cause the second identifier data to be included in second result data for the second compute job.

4. The method of claim 1, wherein the configuration data comprises instructions to modify a configuration file of the log collector component of the orchestrator component, wherein modification of the configuration file causes the first identifier data to be added to log messages generated by the system under test during execution of the first compute job.

5. The method of claim 1, further comprising:
receiving, from a first interface associated with the computing testing component, the result data comprising the first identifier data;
performing a lookup of the data store using the first identifier data; and
displaying, based at least in part on the lookup, log messages associated with the first compute job.

6. The method of claim 1, further comprising:
determining, by the orchestrator component, a second compute job to be deployed by the system under test;
generating second identifier data identifying the second compute job from among other compute jobs; and
generating modified configuration data by modifying the configuration data to include the second identifier data.

7. The method of claim 1, further comprising:
receiving, from a first interface associated with the computing testing component, the result data;
determining message data associated with the result data, wherein the message data indicates that the first compute job failed;
determining the first identifier data included in the result data;
performing a lookup of the data store using the first identifier data; and
displaying, based at least in part on the lookup, log messages associated with the first compute job.

8. The method of claim 1, wherein the first identifier data comprises a 128-bit universally unique identifier (UUID).

9. A system comprising:
at least one processor configured to execute an orchestrator component; and
one or more processors executing a computing testing component using instructions stored in non-transitory computer-readable memory, the computing testing component configured to send first instructions to a system under test to deploy a first compute job, the system under test comprising a container based virtualization system comprising one or more compute nodes;
the orchestrator component configured to:
receive first identifier data identifying the first compute job from among other compute jobs; and
receive configuration data to the system under test, the configuration data comprising the first identifier data, wherein the configuration data is configured to cause a log collector component of the orchestrator component to:
generate at least a first log message during execution of the first compute job, the first log message comprising the first identifier data;
send result data comprising the first identifier data to the computing testing component, wherein the result data is for the first compute job; and
store the first log message in a data store in association with the first identifier data, wherein the first identifier data correlates the first log message with the first compute job; and
wherein the orchestrator component is further configured to modify the configuration data to remove the first identifier data after a conclusion of the first compute job.

10. The system of claim 9, wherein:
the computing testing component is further configured to cause a second compute job to be deployed by the system under test;
the orchestrator component is further configured to:
receive second identifier data identifying the second compute job from among the other compute jobs; and
receive second instructions configured to cause the second identifier data to be included in log messages output by the second compute job.

11. The system of claim 10, wherein the orchestrator component is further configured to receive third instructions configured to cause the second identifier data to be included in second result data for the second compute job.

12. The system of claim 9, wherein the configuration data comprises instructions to modify a configuration file of the log collector component, wherein modification of the configuration file causes the first identifier data to be added to log messages generated by the system under test during execution of the first compute job.

13. The system of claim 9, wherein the orchestrator component is further configured to:
receive, at a first interface, the result data comprising the first identifier data;
perform a lookup of the data store using the first identifier data; and
display, based at least in part on the lookup, log messages associated with the first compute job.

14. The system of claim 9, wherein the orchestrator component is further configured to:
determine a second compute job to be deployed by the system under test;
receive second identifier data identifying the second compute job from among other compute jobs; and
generate modified configuration data by modifying the configuration data to include the second identifier data.

15. The system of claim 9, wherein:
the computing testing component is further configured to:
receive, at a first interface, the result data;
determine message data associated with the result data, wherein the message data indicates that the first compute job failed;
determine the first identifier data included in the result data;
perform a lookup of the data store using the first identifier data; and
display, based at least in part on the lookup, log messages associated with the first compute job.

16. The system of claim 9, wherein the first identifier data comprises a 128-bit universally unique identifier (UUID).

17. A non-transitory machine readable medium storing a program, which when executed by at least one processor causes the at least one processor to:
cause a first compute job to be deployed by a system under test, the system under test comprising a container based virtualization system comprising one or more compute nodes;
generate first identifier data identifying the first compute job from among other compute jobs;

send configuration data comprising the first identifier data to an orchestrator component of the container based virtualization system;

receive, from the system under test, at least a first log message during execution of the first compute job, wherein the first log message comprises the first identifier data;

receive, from the system under test, result data for the first compute job, wherein the result data comprises the first identifier data;

store the first log message in a non-transitory computer-readable memory in association with the first identifier data, wherein the first identifier data correlates the first log message with the first compute job; and modify the configuration data to remove the first identifier data after a conclusion of the first compute job.

18. The non-transitory machine readable medium of claim 17, which, when executed by the at least one processor, further causes the at least one processor to:

cause a second compute job to be deployed by the system under test;

generate second identifier data identifying the second compute job from among other compute jobs; and generate first instructions configured to cause the second identifier data to be included in log messages output by the second compute job.

* * * * *